Feb. 2, 1971        W. M. SLATER        3,559,275
METHOD OF FORMING AN ANCHORAGE FOR PRESTRESS
REINFORCED STRUCTURAL MEMBERS
Filed Oct. 12, 1967        4 Sheets-Sheet 1

INVENTOR.
WILLIAM M. SLATER
BY Featherstonhaugh & Co.

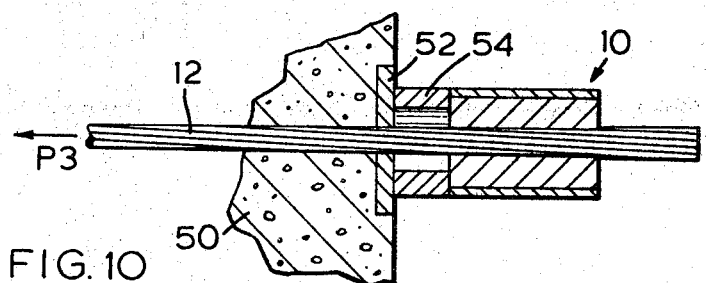
FIG.10
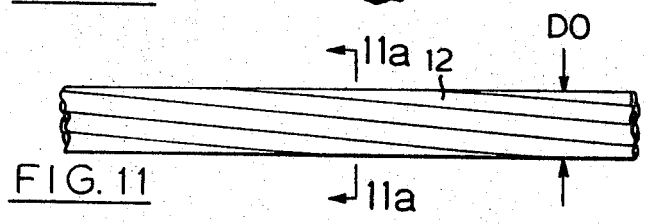
FIG.11
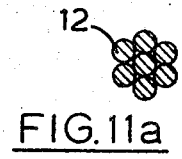
FIG.11a
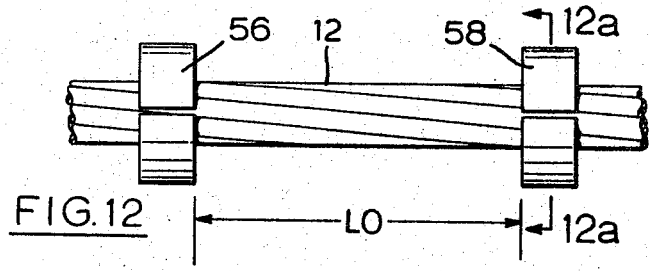
FIG.12
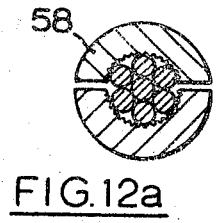
FIG.12a
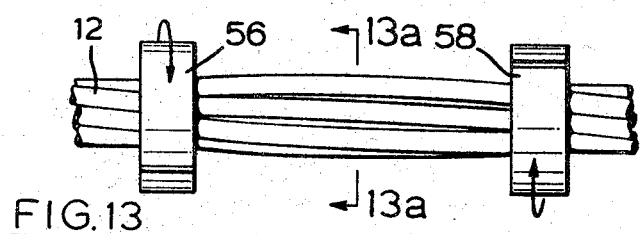
FIG.13
FIG.13a
FIG.14a
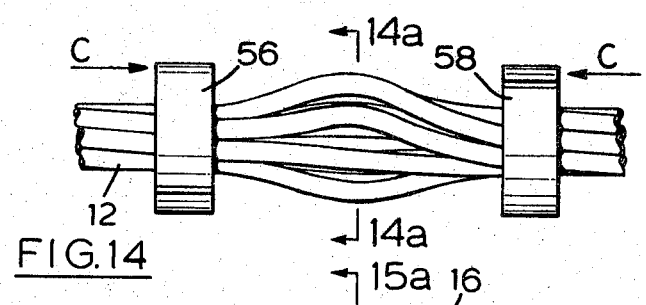
FIG.14
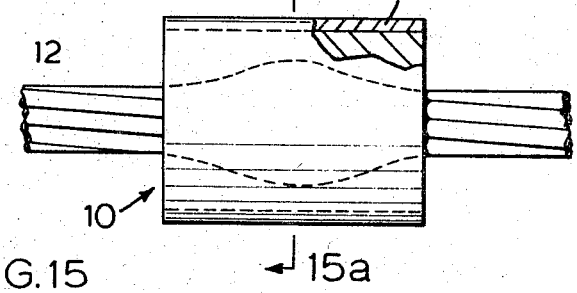
FIG.15
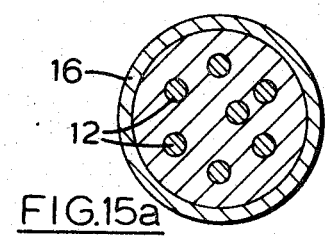
FIG.15a
INVENTOR.
WILLIAM M. SLATER
BY Featherstonhaugh & Co.

Feb. 2, 1971 W. M. SLATER 3,559,275
METHOD OF FORMING AN ANCHORAGE FOR PRESTRESS
REINFORCED STRUCTURAL MEMBERS
Filed Oct. 12, 1967 4 Sheets-Sheet 3

*INVENTOR.*
WILLIAM M. SLATER

BY *Featherstonhaugh & Co.*

ATTORNEYS

INVENTOR.
WILLIAM M. SLATER
BY *Featherstonhaugh & Co.*
ATTORNEYS

United States Patent Office 3,559,275
Patented Feb. 2, 1971

3,559,275
METHOD OF FORMING AN ANCHORAGE FOR PRESTRESS REINFORCED STRUCTURAL MEMBERS
William M. Slater, 259 Heath St. E., Toronto 7, Ontario, Canada
Filed Oct. 12, 1967, Ser. No. 675,000
Int. Cl. B21d 39/00
U.S. Cl. 29—452                                          1 Claim

ABSTRACT OF THE DISCLOSURE

This invention is concerned with the anchoring of tendons of prestressed structural members. In particular the invention relates to an improved method of forming an anchoring device on a tendon at any point on the length of a tendon. The anchoring device is in the form of a molded protrusion of plastic or other material formed on the tendon, at a temperature sufficiently low to prevent weakening of the tendon, and bonded thereto either by an adhesive or by mechanically deforming the tendon.

The anchoring device may be reinforced internally or externally and may have any one of a number of different external contours as required in use. When the anchoring device has been formed on the tendon the tendon may be stressed to form a prestressed tendon of a structural member and the anchoring devices are adapted to bear against the bearing plates to transfer the tensile load on the tendon to a compressive load on the structural member.

BACKGROUND OF THE INVENTION

This invention relates to an improved method of forming an anchoring device on a tendon of a structural member. Prestressed structural members are well known and may employ tendons which are pretension or post-tensioned depending upon the ultimate use of the structural member. Various methods of anchoring tendons of a prestressed structural member have been proposed but each method has had some distinct disadvantage which has limited its application.

One form of known anchoring device is provided with a plurality of holes through which the individual wires of a tendon are passed and the free ends of the wires are mechanically upset after they have passed through the holes formed in the anchoring device and the heads formed by the mechanical upsetting process are pulled against the anchoring device when the prestressing load is applied to the tendon. This form of anchoring device can only be applied to the free ends of a tendon and it requires some form of mechanical upsetting apparatus be available on the construction site. An anchoring device of this type is described in U.S. Pat. No. 2,728,978, Jan. 3, 1956.

Another form of well known anchoring device includes a male conical-shaped wedge which is adapted to secure the strands or wires of a tendon within a female anchor block. When this type of anchoring device is used it is necessary to apply the prestressing load to the tendon before the male wedge is located in its operative position and consequently there is a danger that the prestressed load may decrease due to slippage of the strands within the wedge when the tensioning force is transferred to the anchoring device. An example of this type of anchoring device is to be found in Canadian Pat. No. 604,286, issued Aug. 30, 1960.

Bar tendons are commonly tensioned individually and anchored by wedges or nuts which are adjustable on a threaded end of the bar. The bar may also be formed to receive special gripping nuts which cooperate with the bar to form anchoring devices. In known forms of anchoring devices it is necessary to employ bar tendons which have a specially prepared surface, such as a threaded end, to receive the anchoring device.

The present invention overcomes the difficulties of the prior art discussed above by providing an improved method of forming an anchoring device on a tendon which is to be used in a prestressing of a structural member. The present invention enables an anchoring device to be formed at any required position on the length of a tendon. The anchoring device is formed by a cold moulding process wherein the moulding temperature is less than the temperature which will affect the strength properties of the tendon.

SUMMARY

The present invention provides an improvement in the method of stressing a reinforced tendon in a structure wherein the tendon is retained at at least one free end by an anchoring device that bears against a member under the tensile forces imposed on the tendon. The improvement of the present invention lies in the method of forming the anchoring device on the tendon. The improved method comprises the steps of cold moulding an anchoring device onto the tendon prior to stressing the tendon, the moulding being carried out at a temperature less than the temperature that will affect the strength properties of the tendon.

The invention will be more clearly understood after reference to the following detailed specification read in conjunction with the drawings, wherein:

FIG. 10 is a diagrammatic illustration of the anchoring device in use;

FIGS. 11 and 11a are side and cross-sectional views respectively of a tendon;

FIGS. 12 and 12a are side and cross-sectional views of the tendon of FIGS. 11 and 11a illustratnig the first step in mechanically deforming the tendon before forming the anchoring device;

FIGS. 13 and 13a are side and cross-sectional views respectively of a further step in the mechanical deforming of a tendon;

FIGS. 14 and 14a are side and cross-sectional views respectively of a further deformation step;

FIGS. 15 and 15a are views of the moulded anchoring device;

Figure 1:
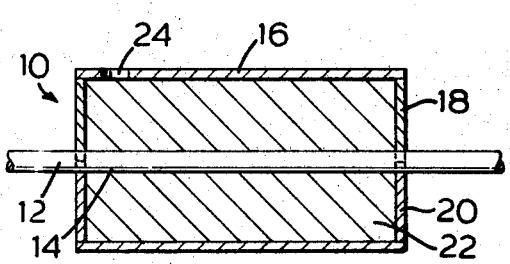
FIG. 1 is a partially sectioned side view of an anchoring device formed on a tendon according to an embodiment of the present invention.

With reference to FIG. 1 of the drawings one form of anchoring device is generally identified by the reference numeral 10. The anchoring device may be formed at any point on the length of a tendon 12 and unlike the anchoring devices of the prior art it is not limited to a location adjacent to the free end of the tendon. The tendon may be a bar, a single wire or groups of wires or a single or a multistrand tendon and various embodiments of the present invention will be described with reference to these different forms of tendon.

The tendon 12 illustrated in FIG. 1 may be a bar, a single wire, or it may be a single strand of a multistrand tendon. Note strands are tendon elements incorporating a plurality of wires. The portion of the tendon 10 to which the anchoring device is to be secured is preselected and in FIG. 1 this portion is identified by the reference numeral 14. In order to form the anchoring device 10 a mould housing or casing 16 which comprises two complementary halves 18 and 20 is located in a position surrounding the portion 14 of the tendon 10 to define therein a mould cavity 22. The anchoring device 10 is formed by introducing plastic material or molten metal into the mould cavity by way of the passage 24. The plastic material or metal should have high strength and low creep properties in order to form a suitable anchoring device. The bond between the anchoring device and the tendon may be mechanical or a combination of chemical and mechanical.

Figure 2:
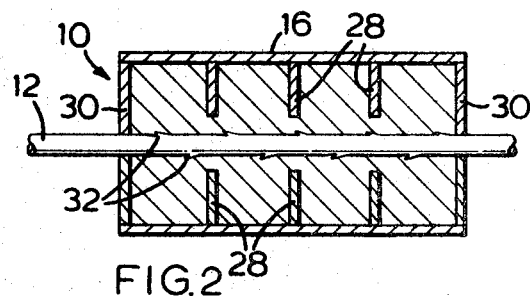
FIG. 2 is a view similar to FIG. 1 of an anchoring device according to a further embodiment of the invention.

In the embodiment illustrated in FIG. 1 the shrinkage which occurs during the setting of the moulded anchoring device may create an interference fit about the tendon and thereby establish a bond between the anchoring device and the tendon. A suitable plastic adhesive may also be employed to improve the bond if necessary. The strength of the moulded anchoring device may be improved by leaving the mould or casing 16 in position after the anchoring device has been formed. The casing may be made from a high tensile steel and would add considerable strength to the anchoring device. The casing 16 may take many forms and an alternative form is iullstrated in FIG. 2 of the drawings. In FIG. 2 the casing 16 has reinforcing ribs 28 extending inwardly therefrom to strengthen the body of the anchoring device. Preferably the end faces 30 of the anchoring device 10 are also reinforced by portions of a casing. It will be noted also in FIG. 2 that a number of barbs 32 are diagrammatically illustrated on the surface of the tendon 12 and it will be readily apparent that by providing such barbs the bond between the tendon and the anchoring device can be substantially improved.

Figure 3:
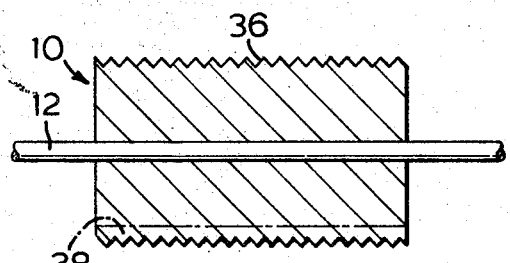
FIG. 3 is a view similar to FIG. 1 of an anchoring device according to a further embodiment of the invention.

An alternative form of anchoring device is illustrated in FIG. 3 wherein the outer surface of the anchoring device is formed with a threaded profile. The thread may be formed on the outside surface of the moulded material itself as illustrated at 36 or it may be formed on an exterior casing as illustrated at 38. The thread profile may be used to cooperate with a locking nut for securing the anchoring device in an operative position when in use.

Figure 4:
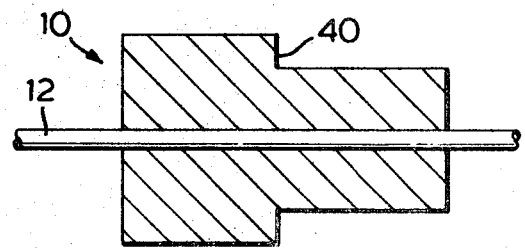
FIG. 4 is a view similar to FIG. 1 of an anchoring device according to a further embodiment of the invention.

It will be apparent that the anchoring device 10 may be shaped to any required contour and a typical example of one alternative shape is shown in FIG. 4 wherein the anchoring device 10 is formed with a shoulder 40.

Figure 5:
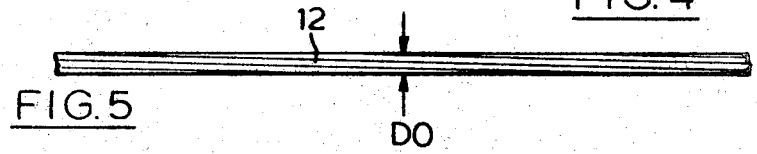
FIG. 5 is a side view of a tendon before the anchoring device is formed thereon.
Figure 6:
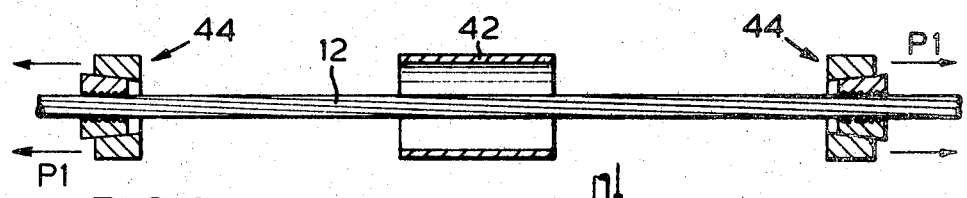
FIG. 6 is a side view of a tendon illustrating the manner in which it is mechanically deformed before the anchoring device is formed thereon.
Figure 7:
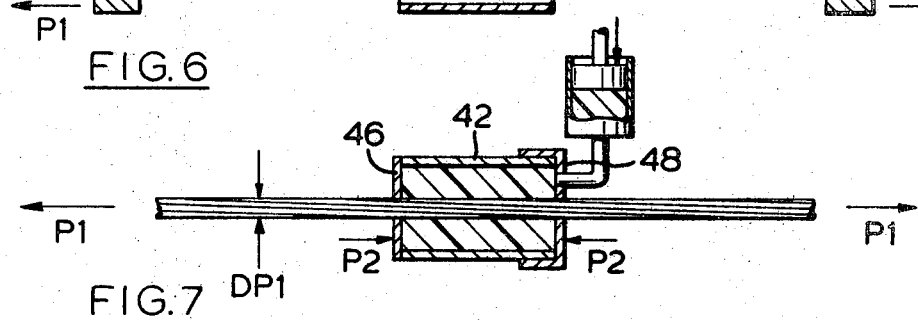
FIG. 7 is a sectional side view diagrammatically illustrating the manner in which the anchoring device is formed.
Figure 8:
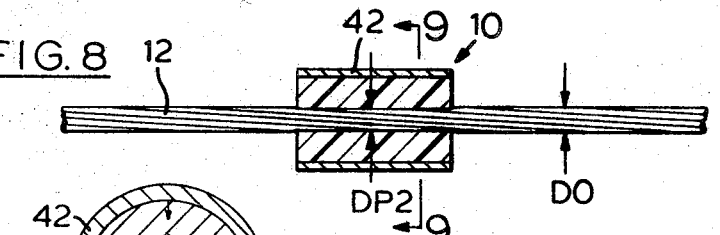
FIG. 8 is a section side view diagrammatically illustrating the condition of the anchoring device after the deforming force has been removed.
Figure 9:
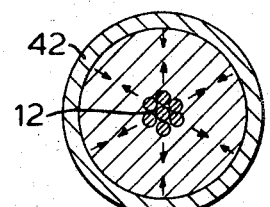
FIG. 9 is a cross-sectional view taken in the direction of the arrow A—A of FIG. 8.

The various forms of the moulded anchoring device 10 which are illustrated in FIGS. 1, 2, 3 and 4 are only typical examples of the forms which the anchoring device might take and it will be apparent that the features of FIG. 2 could be combined with the features of FIG. 3 and/or FIG. 4. Furthermore the anchoring device could be moulded within a mould and the mould removed and a casing formed about the moulded anchoring device or the anchoring device could be reinforced by a filament winding around the outer surface thereof. One method of achieving a suitable mechanical bond between the anchoring device and a tendon is illustrated in FIGS. 5 to 9 inclusive. Referring to FIG. 5 it will be seen that the relaxed tendon has a diameter DO. The tendon illustrated in FIG. 5 is a multiwire strand tendon, however, it will be apparent hereinafter that the method described is not limited to a tendon of this type. In the first stage of the forming operation a casing 42 is located in an operative position over the portion of the tendon upon which the anchoring device is to be formed and this area of the tendon is subjected to a tensile load by suitable clamping devices generally indicated by the reference numerals 44. As a result of this tensile load P1 the diameter of the tendon is reduced to DP1. Referring now to FIG. 7 it will be seen that while the load P1 is maintained end plates 46 and 48 are positioned to close the ends of the casing 42 and plastic or other suitable high strength material is forced into the mould cavity under pressure. The end walls 46 and 48 are maintained in position by the application of a suitable pressure P2. The plastic material is allowed to set while the tensioning load P1 is applied to the tendon. After the moulded material has set the end plates 46 and 48 may be removed and the tensioning load P1 is removed. Referring to FIG. 8 of the drawings it will be seen that when the tensioning load is removed the portion of the tendon which is not surrounded by the anchoring device will return to its original diameter DO while the portion of the tendon which is surrounded by the anchoring device will be prevented from returning to its original diameter by the anchoring and will be restricted to a diameter of DP2. It will, therefore, be apparent that an interference fit has been created between the tendon and the anchoring device. The diameter DP2 of the tendon is somewhat greater than the diameter DP1 and the external diameter of the casing 42 after the tensioning pressure P1 has been removed is somewhat greater than the original external diameter of the casing. The plastic material within the casing is therefore subjected to compression by the desire of the tendon to recover its original diameter DO and the desire of the casing to recover its original diameter.

Turning now to FIG. 10 of the drawings it will be seen that when the anchoring device 10 which has been prepared in accordance with the method described with reference to FIGS. 5 to 9 inclusive is in use after anchoring it is subjected to a tension load P3 and the reduction in the diameter of the tendon which results from the load P3 will not affect the diameter of the portion of the tendon which is remote from the tension load. The installation shown in FIG. 10 of the drawings is typical of a use of the anchoring device of the present invention. The reference numeral 50 refers to the structural member which is to be prestressed by the anchoring device 10 and the reference numeral 52 refers to a bearing plate which is set into the structural member 50. When the required tension P3 has been applied by a suitable jacking device a shim 54 is positioned between the bearing plate 52 and the anchoring device 10 to maintain the required tension within the tendon 12.

Another method of forming a mechanical bond between an anchoring device and a tendon is illustrated in FIGS. 11, 11a to 15, 15a. In this method the tendon 12 is a multiwire strand tendon and has an initial diameter DO. The portion of the tendon upon which the anchoring device is to be formed is preselected and a pair of clamps 56 and 58 are placed about the tendon. The clamps are spaced apart a distance LO which is somewhat greater than the final length of the anchoring device after it has been moulded. As shown in FIG. 13 of the drawings the clamps 56 and 58 are rotated in opposite directions to cause the wires of the strand which form the portion of the tendon which lies between the clamps 56 and 58 to unwind and to separate from one another. After the tendon has been unwound to a position wherein the strands are spaced apart as shown in FIG. 13a an axial compressive force diagrammatically illustrated by the arrow C is applied to the clamping devices and this compressive force causes the strands of the tendon to buckle and bulge outwardly to a position wherein the strands are located relative to one another as shown in FIG. 14a. When the strands are in this position the anchoring device 10 is moulded about the strand in a manner similar to that previously described and after the anchoring device has set the compressive and twisting forces are removed. It will be seen from FIG. 15 of the drawings that the moulded anchoring device will completely fill the spaces formed between the separated wires and consequently when the various forces have been removed and the tendon attempts to return to its original form the moulded material will resist this recovery attempt and consequently the anchoring device will be firmly bonded to the tendon.

Figure 16:
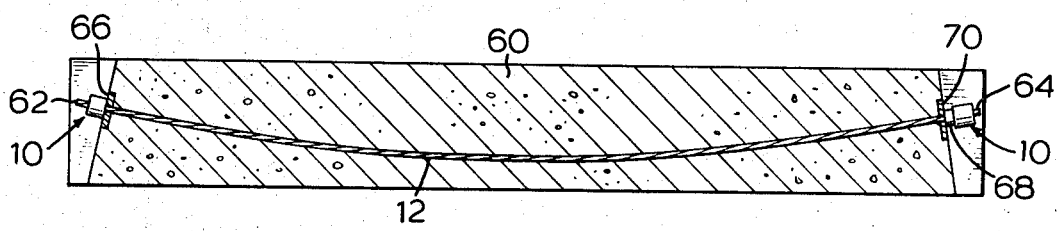
FIG. 16 shows a typical installation employing anchoring devices according to the present invention.

A typical application of the tendon and anchoring device of the present invention is illustrated in FIG. 16. The tendon 12 extends through a structural beam member 60 and one anchoring device 10 is formed at the fixed or dead end 62 of the tendon and a second anchoring device 10 is formed at the tensioning or jacking end 64 of the tendon. The fixed end anchoring device bears directly against a bearing plate 66 and tension is applied by a well known jacking device at the other end of the tendon. When the required tension has been applied to the tendon a shim 68 is inserted between the anchoring device 10 and the bearing plate 70 to maintain the required tension after the jacking force has been removed.

Figure 17:
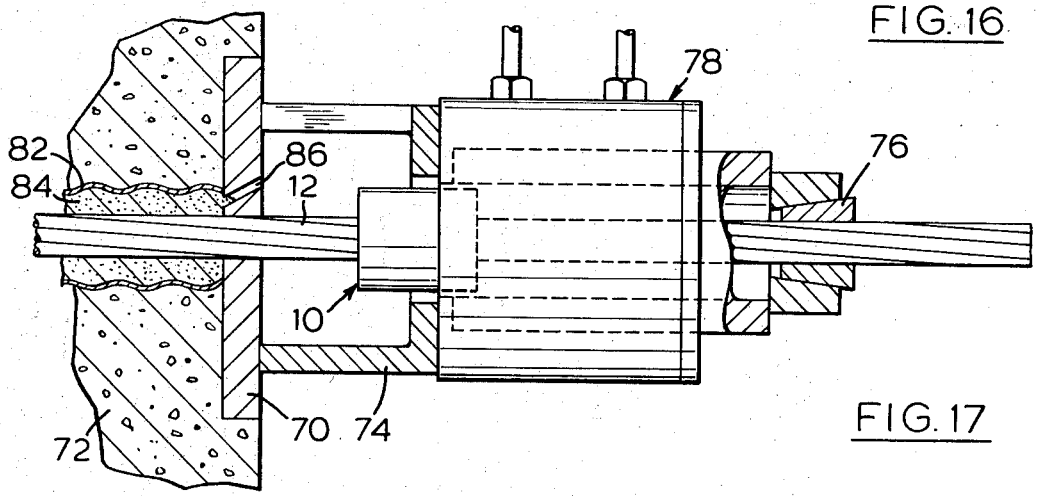
FIG. 17 is a sectional side view illustrating the manner in which a tendon is stressed by a hydraulic jack.
Figure 18:
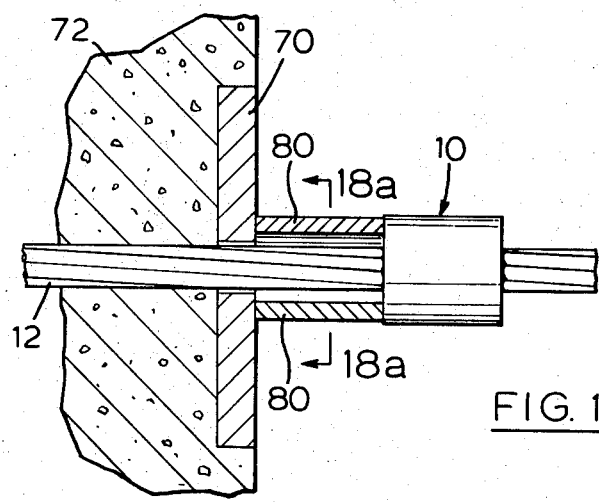
FIG. 18 is a sectional side view showing the manner in which the tension is retained in the tendon by the anchoring device and cooperating shims.
Figure 18A:
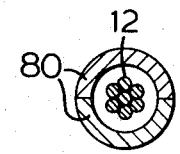
FIG. 18a is a cross-sectional view taken in the direction of the arrow B—B of FIG. 18.

FIGS. 17 and 18 serve to illustrate the method of prestressing a structural member part of which is shown at 72. The tendon 12 is passed through the structural member 72 and is anchored at its dead end (not shown). The free end of the tendon 12 passes through the bearing plate 70 and a jacking chair 74 and is gripped by the chuck 76 of a center hole type hydraulic jack generally indicated by the reference numeral 78. The required tension is applied to the tendon by means of the hydraulic jack 78 and as shown in FIG. 18 anchoring shims 80 are placed between the bearing plate 70 and the anchorage device 10. When the shims are in position the jacking force is removed and the jack is disconnected. In the embodiment illustrated in FIG. 17 the tendon is surrounded by a metal sheath 82 and bonded thereto by a grouting medium 84. The grouting medium 84 enters the space between the tendon and the sheath by way of the passageway 86 formed in the bearing plate 70. In the embodiments illustrated in FIG. 18 the tendon is free to move within the opening formed in the structural members 72 and the tendon is greased to permit free movement therein.

Figure 19:
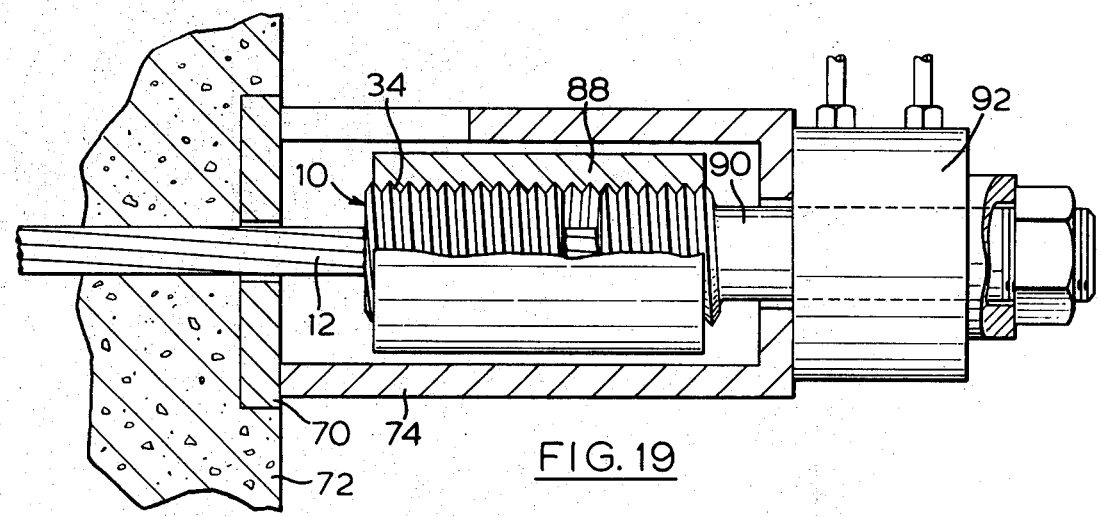
FIG. 19 is a sectional side view illustrating the manner in which the anchoring device may be employed to connect two tendons together in series.

An anchoring device 10 of the type illustrated in FIG. 3 of the drawings is shown in use in FIG. 19 of the drawings. The anchoring device 10 has a thread 34 formed on the external surface thereof and one end of an internally threaded coupler 88 is passed over the anchoring device. The other end of the coupler 88 is connected to the threaded end of a pull rod 90 which is in turn connected to a jacking device 92. The jacking device 92 pulls the pull rod which pulls the threaded coupler which in turn pulls the anchoring device 10 and applies the required tension to the tendon. Anchoring shims are then located between the anchoring device 10 and the bearing plate 70 in the manner illustrated in FIG. 18.

Figure 20:
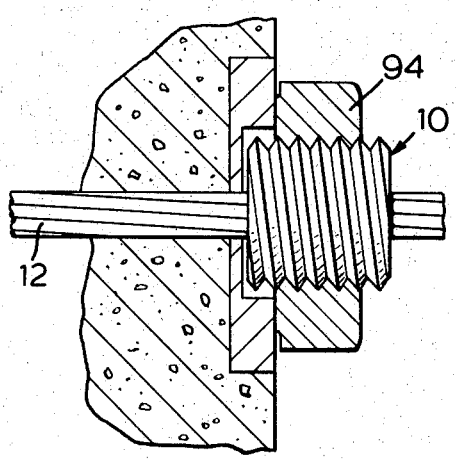
FIG. 20 is a sectional side view of an anchoring device in use with a threaded anchor nut.

A further method of employing a threaded anchoring device is illustrated in FIG. 20 wherein an anchor nut 94 is threaded over the threads of the anchoring device 10 and bears against the bearing plate 70. By rotating the anchoring nut relative to the anchoring device tension can be applied to the tendon 12 or it can be used instead of a shim to anchor the tendon.

It will be apparent that the tendon illustrated in FIGS. 1 to 10 and 16 to 20 may be of the single wire, multiwire strand or bar type and various modifications of the form of the anchoring device will be readily apparent to those skilled in the art.

Figure 21:
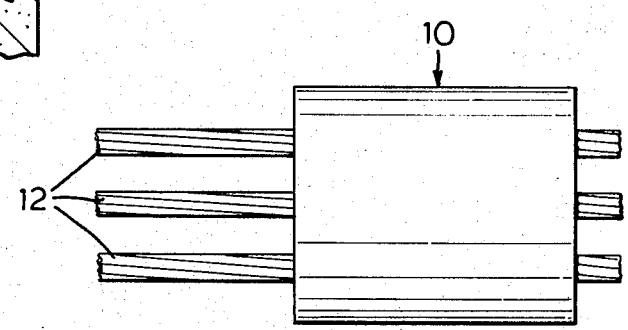
FIG. 21 is a sectional side view of an anchoring device formed about a plurality of tendons.

A further embodiment of the invention is illustrated in FIG. 21 wherein the anchoring device 10 is formed about a plurality of tendons 12.

What is claimed is:

1. In a method of stressing a reinforcing tendon in a structure wherein the tendon is retained at at least one free end by an anchoring device which bears against a member under the tensile forces imposed on the tendon, the improved method of forming the anchoring device on the tendon which comprises, applying a tensile load to the tendon to effect a substantial elastic reduction in the cross-sectional dimensions of the tendon, cold moulding an anchoring onto the tendon while the cross-sectional dimensions of the tendon are elastically reduced by the tensile load, said moulding being carried out a temperature less than the temperature which will affect the strength properties of the tendon, removing the tensile load from the tendon and thereby permitting the elastic forces in the tendon to act on the anchoring device to effect a mechanical bond therebetween, said anchoring device within a reinforcing casing having a shell surrounding the outer surface of the moulded anchoring device and reinforcing ribs extending into said moulded anchoring device, and casing having an outer circumferential surface formed with a screw thread profile for cooperation with a jacking nut in use.

References Cited
UNITED STATES PATENTS

| | | | |
|---|---|---|---|
| 974,719 | 11/1910 | Stevenson | 24—123 |
| 2,412,941 | 12/1946 | Bannerman et al. | 29—452 |
| 2,689,389 | 9/1954 | Sunderland | 29—123X |
| 2,728,978 | 1/1956 | Birkenmaier et al. | 29—452 |
| 3,422,592 | 1/1969 | Gjerde | 24—123 |

CHARLIE T. MOON, Primary Examiner

U.S. Cl. X.R.

24—123; 29—460; 52—223; 164—108; 264—262